(12) United States Patent
Wennersten et al.

(10) Patent No.: US 11,936,859 B2
(45) Date of Patent: Mar. 19, 2024

(54) BILATERAL HIGH FREQUENCY BOOST

(71) Applicant: Telefonaktiebolaget LM Ericsson (publ), Stockholm (SE)

(72) Inventors: Per Wennersten, Årsta (SE); Jacob Ström, Stockholm (SE); Jack Enhorn, Kista (SE); Du Liu, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 494 days.

(21) Appl. No.: 17/255,240

(22) PCT Filed: Jul. 2, 2019

(86) PCT No.: PCT/EP2019/067711
§ 371 (c)(1),
(2) Date: Dec. 22, 2020

(87) PCT Pub. No.: WO2020/007848
PCT Pub. Date: Jan. 9, 2020

(65) Prior Publication Data
US 2021/0321094 A1 Oct. 14, 2021

Related U.S. Application Data

(60) Provisional application No. 62/693,160, filed on Jul. 2, 2018.

(51) Int. Cl.
*H04N 19/117* (2014.01)
*H04N 19/126* (2014.01)
(Continued)

(52) U.S. Cl.
CPC ......... *H04N 19/117* (2014.11); *H04N 19/126* (2014.11); *H04N 19/176* (2014.11); *H04N 19/82* (2014.11)

(58) Field of Classification Search
CPC .. H04N 19/103; H04N 19/124; H04N 19/176; H04N 19/182; H04N 19/61;
(Continued)

(56) References Cited

U.S. PATENT DOCUMENTS

2013/0272386 A1* 10/2013 Yu ........................ H04N 19/172
375/240.03
2017/0111639 A1* 4/2017 Jung ..................... H04N 19/103
(Continued)

FOREIGN PATENT DOCUMENTS

CN 106341689 A * 1/2017 ........... H04N 19/122

OTHER PUBLICATIONS

International Search Report and the Written Opinion of the International Searching Authority, issued in corresponding International Application No. PCT/EP2019/067711, dated Jan. 10, 2019, 15 pages.
(Continued)

*Primary Examiner* — Kathleen M Walsh
(74) *Attorney, Agent, or Firm* — Rothwell, Figg, Ernst & Manbeck, P.C.

(57) ABSTRACT

Methods and apparatuses for video processing. In one aspect, filtering is applied after applying a set of offset values to one or more coefficients. The application of an offset value may be based on a determination as to whether the coefficient meets a threshold value.

26 Claims, 8 Drawing Sheets

(51) Int. Cl.
*H04N 19/176* (2014.01)
*H04N 19/82* (2014.01)

(58) Field of Classification Search
CPC ...... H04N 19/122; H04N 19/13; H04N 19/19; H04N 19/567; H04N 19/577; A63F 13/45; A63F 13/55; A63F 13/56; A63F 13/70; A63F 13/847
USPC .................................................. 375/240.12
See application file for complete search history.

(56) References Cited

U.S. PATENT DOCUMENTS

| | | | |
|---|---|---|---|
| 2017/0127062 A1* | 5/2017 | Zhao | H04N 19/126 |
| 2018/0176599 A1* | 6/2018 | Park | H04N 19/182 |
| 2019/0014349 A1* | 1/2019 | Karczewicz | H04N 19/107 |
| 2020/0014956 A1* | 1/2020 | Rosewarne | H04N 19/146 |
| 2020/0128274 A1* | 4/2020 | Rosewarne | H04N 21/236 |

OTHER PUBLICATIONS

Xu et al. "A Fine Rate Control Algorithm With Adaptive Rounding Offsets (ARO)" IEEE Transactions on Circuits and Systems for Video Technology, Oct. 1, 2009 Institute of Electrical and Electronics Engineers, US, vol. 19, No. 10, Oct. 2009, 12 pages.
Wennersten et al. "Bilateral Filtering for Video Coding" IEEE VCIP '17, Dec. 10-13, 2017, St. Petersburg, FL, 4 pages.

\* cited by examiner

200

| 0 | 6 | 10 | 11 | 12 | 9 | 4 | 1 |
| --- | --- | --- | --- | --- | --- | --- | --- |
| 6 | 9 | 12 | 12 | 11 | 9 | 5 | 2 |
| 10 | 12 | 14 | 12 | 10 | 8 | 7 | 3 |
| 11 | 12 | 12 | 10 | 6 | 6 | 5 | 4 |
| 12 | 12 | 10 | 6 | 6 | 5 | 4 | 3 |
| 9 | 9 | 8 | 6 | 5 | 4 | 3 | 2 |
| 4 | 5 | 7 | 5 | 4 | 3 | 2 | 1 |
| 1 | 2 | 3 | 4 | 3 | 2 | 1 | 1 |

```
Int mymatfinal[64] = { 0, -6, -10, -11, -12, -9, -4, -1
    , -6, -9, -12, -12, -11, -9, -5, -2
    , -10, -12, -14, -12, -10, -8, -7, -3
    , -11, -12, -12, -10, -6, -6, -5, -4
    , -12, -12, -10, -6, -6, -5, -4, -3
    , -9, -9, -8, -6, -5, -4, -3, -2
    , -4, -5, -7, -5, -4, -3, -2, -1

, -1, -2, -3, -4, -3, -2, -1, -1 );
Float modfac = pow(2, (qp - 42) / 6);
Float hundred = modfac * 100;
modfac=modfac*1.25;
if (uiWidth<=8&&uiHeight<=8)
    {
        Int bigcount = 0;
        for (Int y = 0; y < uiHeight; y++)
        {
            for (Int x = 0; x < uiWidth; x++)
            {
                if (tempCoeff.at(x, y)>hundred || tempCoeff.at(x, y) < -hundred)
                {
                    bigcount++;
                }
            }
        }

Int lowmul = 1;
        if (bigcount <=8)
          lowmul = 2;
        if (bigcount <=4)
          lowmul = 4;
        if (bigcount <= 2)
          lowmul = 8;
        for (Int y = 0; y < uiHeight; y++)
        {
            for (Int x = 0; x < uiWidth; x++)
            {
                if (tempCoeff.at(x,y)>hundred)
                {
                    tempCoeff.at(x,y) -= round(modfac * lowmul * mymatfinal[y * 8 + x]);
                }
                else if (tempCoeff.at(x,y) < -hundred)
                {
                    tempCoeff.at(x,y) += round(modfac * lowmul * mymatfinal[y * 8 + x]);
                }
            }
        }

BILATERAL HIGH FREQUENCY BOOST

CROSS REFERENCE TO RELATED APPLICATION(S)

This application is a 35 U.S.C. § 371 National Phase of PCT/EP2019/067711, filed Jul. 2, 2019, designating the United States, which claims the benefit of U.S. Provisional Application No. 62/693,160, filed Jul. 2, 2018, the disclosures of which are incorporated herein by this reference.

TECHNICAL FIELD

This disclosure relates to apparatuses and methods for the processing of media objects, such as videos. Some aspects of this disclosure relate to apparatuses and methods for encoding, decoding, and/or filtering one or more components of a video object.

BACKGROUND

Bilateral filtering of image data directly after forming the reconstructed image block can be beneficial for video compression. As described by Wennersten et al., in "Bilateral Filtering for Video Coding", *IEEE VCIP '17*, Dec. 10-13, 2017, it is possible to reach a bit rate reduction of 0.5% with maintained visual quality for a complexity increase of 3% (encode) and 0% (decode) for random access. Other forms of filtering are used with respect to video images as well.

However, there remains a need for effective processing to offset certain downsides of filtering. This includes, for example, offsets for bilateral filtering.

SUMMARY

According to some embodiments, a method for processing a media object is provided. The method may include applying a set of offset values to a set of coefficients associated with the media object, wherein each offset value of the set of offset values corresponds to a separate coefficient of the set of coefficients. In certain aspects, applying the set of offset values comprises: (1) determining whether a coefficient value is larger than a positive threshold or smaller than a negative threshold, and (2) based on the determination, adding a corresponding offset value to the coefficient value when the coefficient value is larger than the positive threshold or subtracting the corresponding offset value from the coefficient value when the coefficient value is smaller than the negative threshold. After applying the set of offset values, method further includes performing a filtering operation on the media object.

According to some embodiments, a method for processing a media object is provided. The method may include determining an initial offset value for at least one coefficient of a set of coefficients associated with the media object, and determining an adjusted offset value for the coefficient. In certain embodiments, the adjusted offset value is determined based at least in part on the initial offset value and a modification factor. In certain embodiments, determining the initial offset value and determining the adjusted offset value is based on determining that a value of the coefficient meets or exceeds a threshold. In some instances, the method may include further steps such as: generating the set of coefficients by performing an inverse quantization process on a plurality of quantized values associated with the media object; applying the adjusted offset value to the coefficient to generate a modified coefficient; performing an inverse transform using the modified coefficient; and performing a filtering operation. The filtering operation may comprise, for example, one or more of bilateral filtering, deblocking filtering, adaptive loop filtering, and sample adaptive offset filtering.

According to embodiments, there is provided a method for applying filtering to a media object comprising a plurality of samples. The method includes applying a set of offset values to a set of coefficients, wherein each offset value of the set of offset values corresponds to a separate coefficient of the set of coefficients. In some embodiments, the step of applying the set of offset values includes determining whether a coefficient value is larger than a positive threshold or smaller than a negative threshold, and applying a corresponding offset value to the coefficient value based on the determination. If the coefficient value is larger than the positive threshold, then the method adds the corresponding value to the coefficient value, and if the coefficient value is smaller than the negative threshold, the method subtracts the corresponding value from the coefficient value. In some embodiments, the method includes a further step in which the number of coefficients in the set of coefficients having a value (i) larger than the positive threshold or (ii) smaller than the negative threshold is determined. A factor value can be determined based on the determined number of coefficients, which can affect the amount of offset. The method can also include applying filtering after applying the set of offset values.

Also, and in certain aspects, the step of adding the corresponding offset value to the coefficient value includes multiplying the corresponding offset value, a determined factor value, and/or a quantization factor to obtain a multiplied offset value and adding the multiplied offset value to the coefficient value. Similarly, the step of subtracting the corresponding offset value from the coefficient value can include multiplying the corresponding offset value, the determined factor value, and/or a quantization factor to obtain a multiplied offset value and subtracting the multiplied offset value from the coefficient value.

In some embodiments, after dequantization, coefficients are modified by constants to be further closer to or further away from zero. The size of the modification can be based, for example, on the number of nonzero coefficients.

According to some embodiments, an encoder or decoder is provided that is configured to perform one or more of the methods of offset and filtering methods.

According to some embodiments, a computer program product is provided, which comprises a non-transitory computer readable medium storing instructions that when performed by processing circuitry of a video processing device, causes the device to perform one or more the foregoing methods.

According to some embodiments, a video processing device (e.g., an encoder or decoder) is provided. The device may include a memory and a processor, wherein the processor is configured to perform one or more of the foregoing methods.

BRIEF DESCRIPTION OF THE DRAWINGS

The accompanying drawings, which are incorporated herein and form part of the specification, illustrate various embodiments.

FIG. 2 illustrates an offset value table according to embodiments.

FIG. 3 shows computer code according to embodiments.

DETAILED DESCRIPTION

Although a bilateral filter is an adaptive filter, it still has much in common with a regular low-pass filter. In particular, a bilateral filter on average acts as a low-pass filter by reducing high frequencies. Because frequencies are correct—on average—before filtering, this reduction in high frequencies can be a problem. According to embodiments, this and other issues may be addressed by boosting high frequencies before filtering, such that the frequencies will be correct after the filtering is applied. In certain aspects, by boosting the high frequencies before filtering, the benefits of the filtering are obtained while maintaining correct average values for all frequencies. Additionally, and in accordance with some embodiments, by boosting the high frequencies before rather than after applying the filtering, the boost to the high frequencies may be applied in the frequency domain while the filtering is applied in the pixel domain after the inverse transform. In some instances, compression efficiency may be improved by approximately 0.1%. Although illustrated with bilateral filtering as an example, embodiments may implement other forms of filtering.

Figure 1:
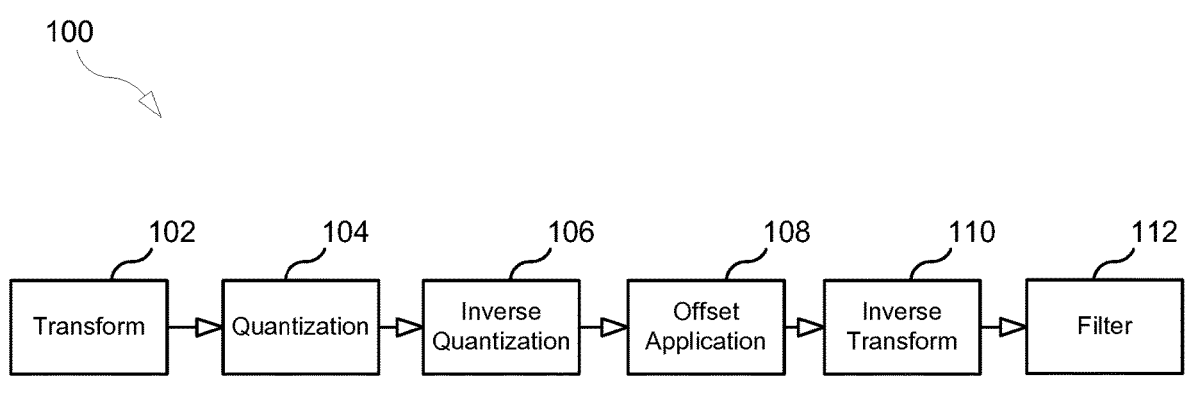
FIG. 1 illustrates a flowchart illustrating a process according to embodiments.

FIG. 1 shows a flowchart illustrating a process 100 according to embodiments. This process may be performed by one or more media processing devices, such as an encoder or decoder for video processing. In some embodiments, an encoder performs steps 102 and 104 and a decoder performs steps 106, 108, 110, and 112. In such embodiments, the decoder performs the proposed offset process as described in the current disclosure in step 108. In some embodiments, an encoder performs all of the steps shown in FIG. 1. In certain aspects, an encoder can perform the proposed offset application 108. For instance, an encoder may include an inverse quantization step to keep track of what one or more pixels may look like after decoding. In this instance, the encoder can be adapted to make one or more adjustments or offsets in order to mimic decoder behavior. In some other embodiments, the decoder performs all of the steps shown in FIG. 1.

Referring now to FIG. 1, and according to some embodiments, after an encoding process including a transform (step 102) and quantization (step 104), coefficients tend to be small integers, for example, 3, −1, 0 and 1. These numbers are used as an example, but not limiting. The methods and devices disclosed herein may be used for smaller or larger values. After being decoded, the coefficients are dequantized by multiplying them with a quantization factor (step 106), which is often referred to as inverse quantization. For example, if the quantization factor is 200, the above exemplary values for the coefficients become 600,−200, 0 and 200. In the proposed offset application method (step 108), an offset value is added or subtracted to the coefficients at this stage, depending on the coefficient value and its sign. For example, if an offset value of 10 is to be added to a coefficient, −10 is added to the negative coefficient. As another example, and in some embodiments, if the coefficient is 0, nothing is added to or subtracted from the coefficient. Accordingly, and with reference to the above exemplary values for the coefficients, adding an offset value of 10 to the coefficients yields 610, −210, 0 and 210. If the added offset value (e.g., the value of 10) is correctly selected, the coefficients on average would become 600, −200, 0, and 200 after applying the filtering (step 112). In some embodiments, the filtering may be any type of filtering used in video coding. For example, the filtering may be bilateral filtering, deblocking filtering, adaptive loop filtering or sample adaptive offset filtering.

FIG. 2 illustrates an offset value table 200 according to one embodiment. In some embodiments, an offset value in the offset value is added to a corresponding coefficient in step 108. For example, if the coefficient at (3,0) is 400 after dequantization (step 106), the offset value at (3,0) in the offset value table 200 is added to the coefficient. In this example, the coefficient value becomes 411. In some embodiments, the table 200 is used for blocks of size 4×4, 8×4, 4×8 and 8×8. For 4×4-blocks, the top-left corner of the table 200 comprising the corresponding 4×4 values is used.

The values of FIG. 2 are provided as an example, and the method may be implemented without using these exact values; similar values would also work well. However, and according to embodiments, the decoder and the encoder agree on exactly which values to use. This may prevent, for instance, drift such that the decoded video will accumulate errors over time. In general, the offset values at that the top left corner, which correspond to low frequencies should have smaller values. At the right and bottom edges, which correspond to higher frequencies, smaller values may also be used. However, for the coefficients in the middle, which correspond to middle frequencies, the highest values should be used in some embodiments. This means that the largest changes will happen for frequencies that are neither small nor high, but somewhere in between. Alternative values to those set forth in FIG. 2 may be derived experimentally for a particular filter (or filter set) by measuring the average effect of the desired filters. Because the filters present in a given codec (e.g., VVC) may tend to, on average, reduce frequencies, some more than others, by boosting selected frequencies prior to filtering, the two operations combined no longer change the average coefficient values. Thus, the offset values may be adjusted until average values are unchanged for the particular filter or filter set.

Referring now to FIG. 2, the offset values in the table 200 are suitable for a particular quantization factor (QF) (and corresponding quantization parameter (QP)-value). In some embodiments, the quantization factor QF used for offset is different from the quantization factor used for quantization/dequantizatoin in the encoder or decoder. For instance, it may differ by a factor of 128. For a given encoder, the quantization factor may not necessarily be specified directly, but rather by the quantization parameter (QP), which maps to a specific factor. In order to account for quantization factor, offset values in the table 200 may be multiplied by QF=pow(2, (qp−42)/6) before use. In some embodiments, this would be implemented by a table lookup rather than directly calculating the value of the exponential. In some other embodiments, different and similar functions may also be used.

According to embodiments, only non-zero coefficients in a block should be changed. If secondary transforms are used, however, coefficients between 100*QF and −100*QF may be processed as if zero. A version of the Versatile Video Coding (VVC) codec includes what is referred to a secondary transform. Without the secondary transform, the decoder performs the following: decode coefficients→inverse quantize coefficients using QP→inverse transform rows (using a primary transform)→inverse transform columns (also using a primary transform)→add prediction. In this instance, different primary transforms can be used for the rows and the columns. As an example, the rows could have been transformed with DCT2, and the columns with DST7.

However, with a secondary transform, part of the block can be transformed a second time in the encoder. Instead of transforming rows and columns individually, the transform can act on the 2D coefficients simultaneously, i.e., it is non-separable. Since the decoder does everything in reverse, the inverse secondary transform actually comes before the primary transforms in the decoder. Hence, a codec that uses secondary transforms can operate according to: decode coefficients→inverse quantize coefficients using QP→inverse transform 2D block (using a secondary transform)→inverse transform rows (using a primary transform)→inverse transform columns (also using a primary transform)→add prediction. Since a non-separable 2D transform is often more expensive than a separable one (that acts on rows and columns separately), only part of the block is typically transformed using the secondary transform. As an example, if the block consists of 16×16 coefficients, perhaps only the top left 4×4 coefficients (corresponding to the lowest frequencies) are treated with the secondary transform. In embodiments, coefficients with values between 100*QF and −100*QF may be processed as if zero.

According to some embodiments, the amount of offset used may be based, at least in part, on the number of non-zero coefficients. Specifically, it is observed that the effect of the filtering on each coefficient is larger if a block has fewer non-zero coefficients. Accordingly, a new factor (NF) can be use in some embodiments. For instance, an NF of 8 can be used one or two coefficients of a block are non-zero. In some embodiments, the NF is 4 if less than five coefficients of the block are non-zero. In some embodiments, the NF is 2 if less than nine coefficients of the block are non-zero. Otherwise, the NF is 1 according to embodiments.

In some embodiments, the NF depends on the maximum frequency of a non-zero coefficient. In such embodiments, the NF would be 2, otherwise 1, for the coefficients in an 8×8 block in the top-left corner. For example, NF may be 2 if there are no non-zero coefficients outside of the top-left part of the block. If there is at least one non-zero coefficient outside of the top-left area, NF may be 1. According to embodiments, top-left can be defined as a specific region or dimensions, such as x+y<3.

In some embodiments, the operation performed for each coefficient (x,y) in a block can be stated as:
If(coefficient(x,y)>100*QF)
   Add table(x,y)*QF*NF to coefficient(x,y)
Else if(coefficient(x,y)<−100*QF)
   Subtract table(x,y)*QF*NF from coefficient(x,y)

FIG. 3 shows code 300 implementing certain embodiments described herein.

The proposed offset process can be expanded in a number of ways, including: (1) enabling the processing of larger blocks, either with a larger table or only applied to the top-left coefficients of the larger block; (2) having parameters depend on the block size, such as, unique tables per block size or multiplying the coefficients by a unique constant per block size; and (3) further optimization of the table, as described above.

Figure 4:
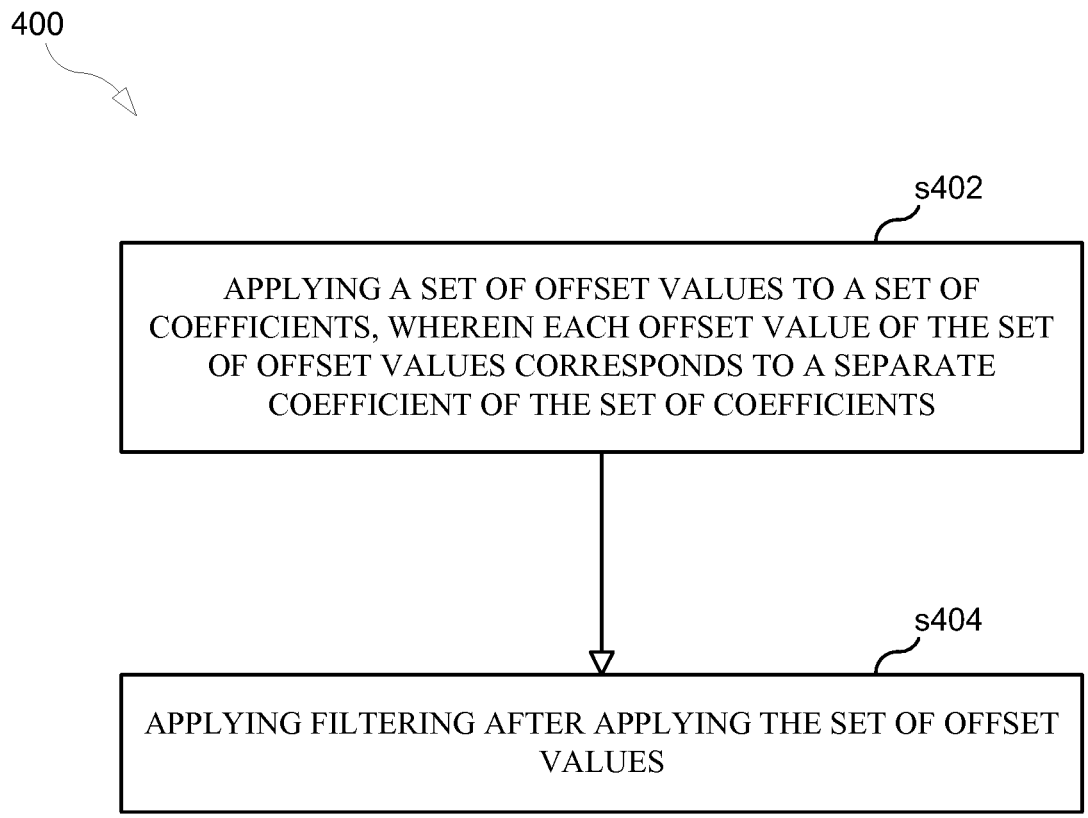
FIG. 4 is a flow chart illustrating a process according to embodiments.

FIG. 4 is a flow chart illustrating a process 400 for applying filtering to a media object comprising a plurality of samples according to some embodiments. Process 400 may being with step s402 in which a set of offset values is applied to a set of coefficients. In some embodiments, each offset value of the set of offset values corresponds to a separate coefficient of the set of coefficients. In some embodiments, the step of applying the set of offset values includes determining whether a coefficient value is larger than a positive threshold or smaller than a negative threshold and applying a corresponding offset value to the coefficient value based on the determination whether the coefficient value is larger than the positive threshold or smaller than the negative threshold, such that, if the coefficient value is larger than the positive threshold, then adding the corresponding value to the coefficient value, and if the coefficient value is smaller than the negative threshold, then subtracting the corresponding value from the coefficient value. In step s404, the filtering is applied after applying the set of offset values. In some embodiments, the filtering comprises one of: bilateral filtering, deblocking filtering, adaptive loop filtering or sample adaptive offset filtering.

In some embodiments, process 400 includes a further step in which the number of coefficients in the set of coefficients having a value (i) larger than the positive threshold (e.g., 100*Quantization Factor) or (ii) smaller than the negative threshold (e.g., −100*QF) is determined.

In some embodiments, process 400 includes a further step in which a factor value (e.g., New Factor) is determined based on the determined number of coefficients.

In some embodiments, the step of adding the corresponding offset value to the coefficient value includes multiplying the corresponding offset value, the determined factor value, and a quantization factor to obtain a multiplied offset value and adding the multiplied offset value to the coefficient value.

In some embodiments, the step of subtracting the corresponding offset value from the coefficient value includes multiplying the corresponding offset value, the determined factor value, and a quantization factor to obtain a multiplied offset value and subtracting the multiplied offset value from the coefficient value.

Figure 5A:
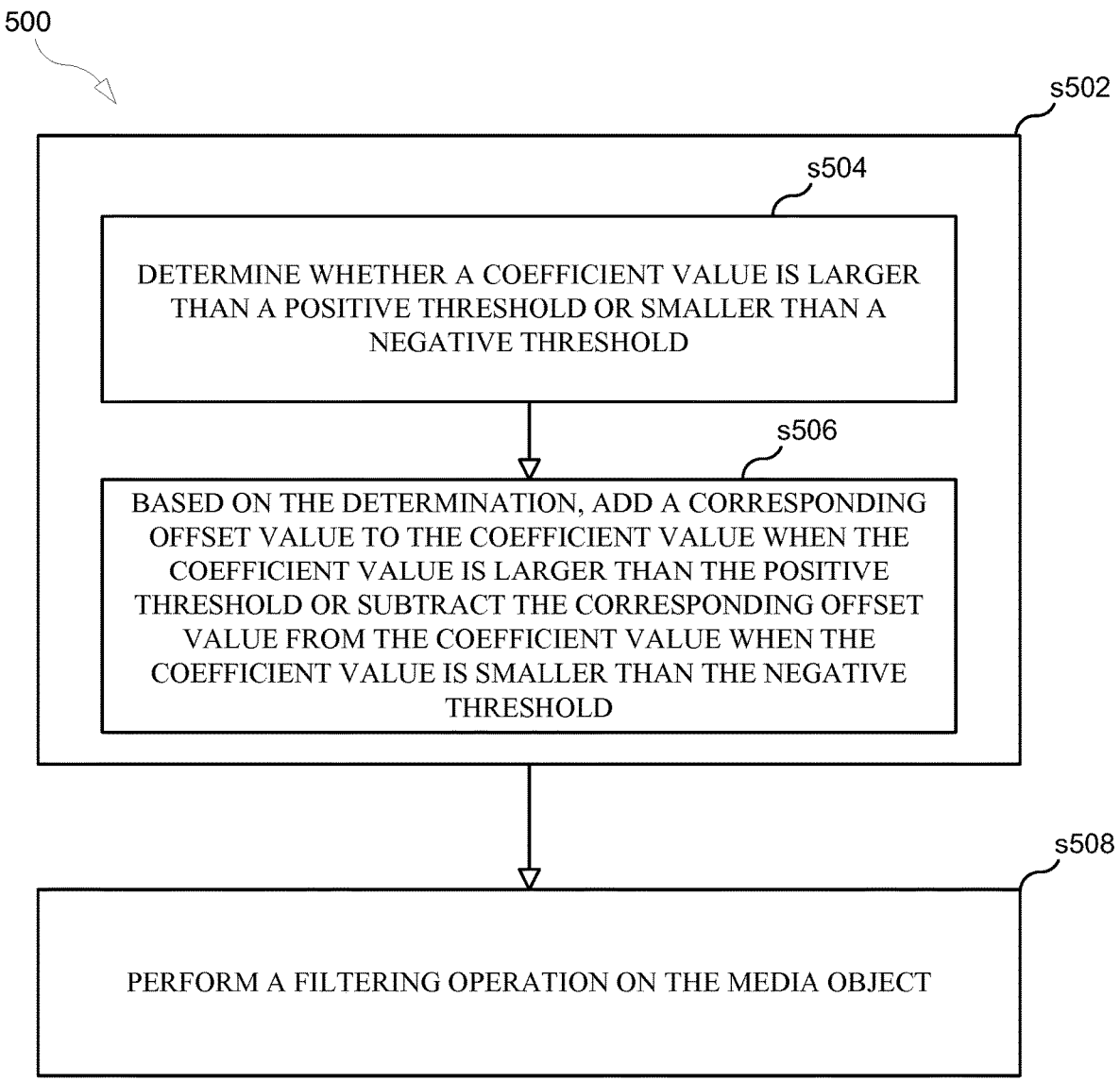
FIGS. 5A and 5B are flow charts illustrating processes according to embodiments.
Figure 5B:
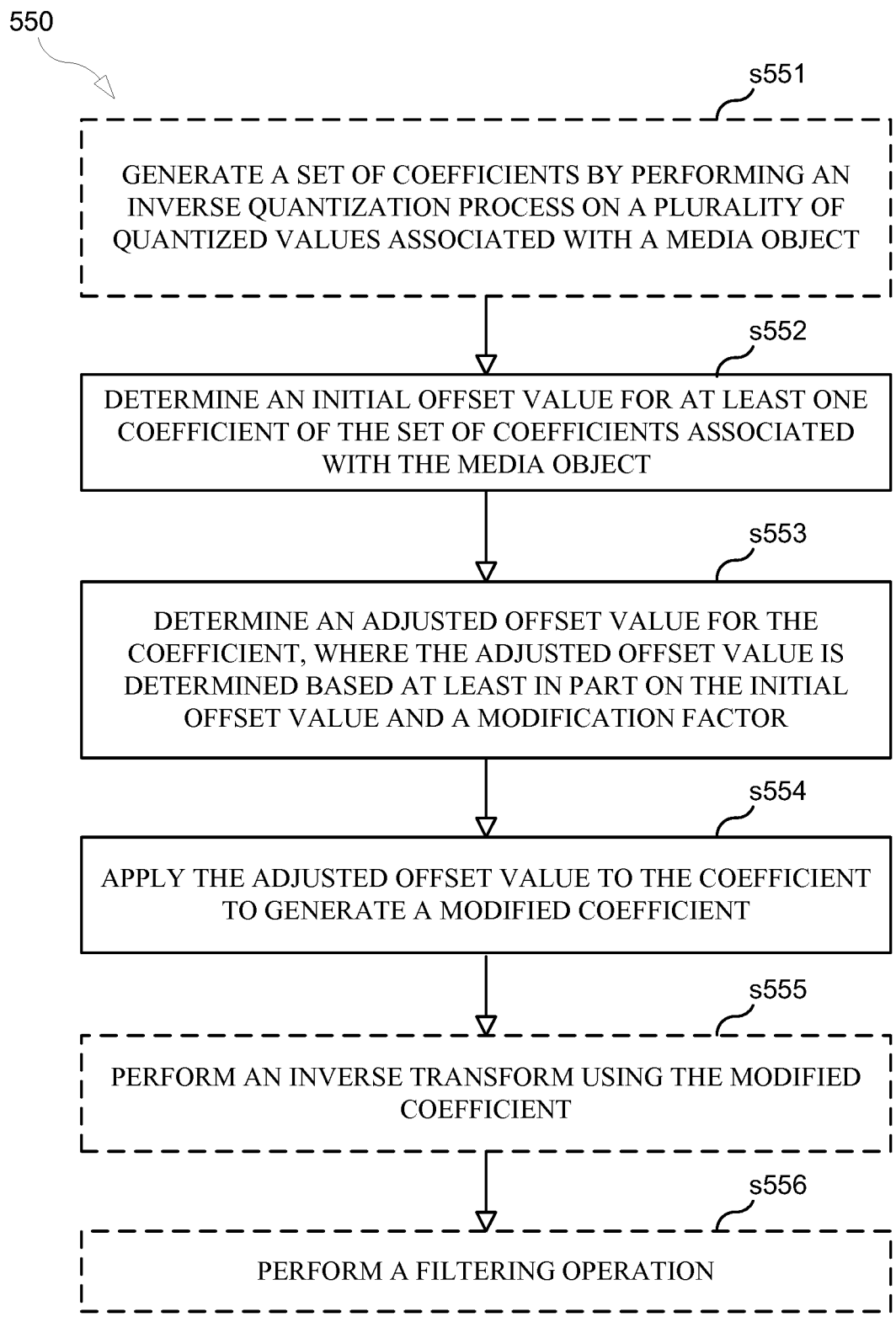

FIGS. 5A and 5B illustrate methods for processing a media object according to embodiments. The methods may be performed, for instance, by processing device 600, 700, which may be one or more of an encoder and/or decoder. In some embodiments, the methods of FIGS. 5A and 5B can be used to process a video image as part of a coding process related to video compression.

Referring now to FIG. 5A, a process 500 is shown. Process 500 may begin with the step (s502) of applying a set of offset values to a set of coefficients associated with the media object, wherein each offset value of the set of offset values corresponds to a separate coefficient of the set of coefficients. The set of coefficients may correspond to an entire block of the media object; the set of coefficients may correspond to portion of a block of the media object. The set of coefficients may be, for example, a subset of a larger set of coefficients corresponding to the media object, and the set of coefficients are the top-left coefficients of the larger set.

According to embodiments, applying (s502) may comprise determining (s504) whether a coefficient value is larger than a positive threshold or smaller than a negative threshold. Based on this determination, a corresponding offset value can be added (s506) to the coefficient value when the coefficient value is larger than the positive threshold or subtracting the corresponding offset value from the coefficient value when the coefficient value is smaller than the negative threshold. After the offset is applied, the process 500 may then perform a filtering operation (s508) on the media object. This may include, for instance, applying a filter to the result of an inverse transform that uses the modified coefficients after offset. According to embodiments, the media object comprises a plurality of video images and the filtering operation is one or more of bilateral filtering, deblocking filtering, adaptive loop filtering, and sample adaptive offset filtering In some embodiments, the process 500 also includes determining the number of coefficients in the set of coefficients having a value that is either larger than the positive threshold or smaller than the negative threshold. In this instance, the corresponding offset value that is used is based at least in part on the determined number. Also, the process 500 can include determining a factor value based on the number of coefficients in the set of coefficients having a value that is either larger than the positive threshold or smaller than the negative threshold. In this instance, the corresponding offset value is a product of at least an initial offset value and the determined factor value. In some embodiments, the offset value is based at least in part on a quantization factor or quantization parameter value.

According to embodiments, the process 500 may implement a frequency multiplier that is based on determining the maximum frequency of any non-zero coefficients in the set of coefficients. In this instance, the corresponding offset value can be a product of at least an initial offset value and the determined frequency multiplier. For example, the frequency multiplier might be 2.

In some embodiments, the corresponding offset value is a product of at least an initial offset value and the multiplier based on a block size for samples of the media object.

Referring now to FIG. 5B, a process 550 is shown. According to some embodiments, process 550 begins with optional step s551, in which a set of coefficients is generated. The set of coefficients may be generated, for instance, by performing an inverse quantization process on a plurality of quantized values associated with a media object. In step s552, an initial offset value is determined for at least one coefficient of a set of coefficients associated with the media object. In some instances, the initial offset value is determined by selecting the value from a table, such as a look up table. In step s553, an adjusted offset value is determined for the coefficient. According to embodiments, the adjusted offset value is determined based at least in part on the initial offset value and a modification factor. In some embodiments, one or more of determining the initial offset value and determining the adjusted offset value is based on determining that a value of the coefficient meets or exceeds a threshold. The threshold may be zero in some instances. In step s554, the adjusted offset value is applied to the coefficient to generate a modified coefficient. The process 550 may also include optional steps s555 and s556. Step s555 includes performing an inverse transform using the modified coefficient, and step s556 includes performing a filtering operation.

According to some embodiments, the modification factor used in process 550 is based at least in part on: (i) the number of coefficients in the set of coefficients having a magnitude that is greater than the threshold, (ii) quantization factor or quantization parameter value, and (3) the maximum frequency of any non-zero coefficients of the set of coefficients.

In some embodiments, the set of coefficients corresponds to an image block and at least one of determining an initial offset value or adjusted offset value is repeated for each coefficient of the set. At least of the modification factor and the initial offset value can be based on a size of the block.

In some embodiments, the set of coefficients corresponds to an image block and the modification factor is further based on the number of non-zero coefficients for said block. In some embodiments of process 550, the modification factor may defined as:

$$QF*NF,$$

where NF is determined according to the number of non-zero coefficients in the block and QF is based on one or more of the quantization factor and quantization parameter. The value of NF may be, for example, 8 if one or two coefficients of the block are non-zero, 4 if less than five coefficients of the block are non-zero, 2 if less than nine coefficients of the block are non-zero, and otherwise 1.

Figure 6:
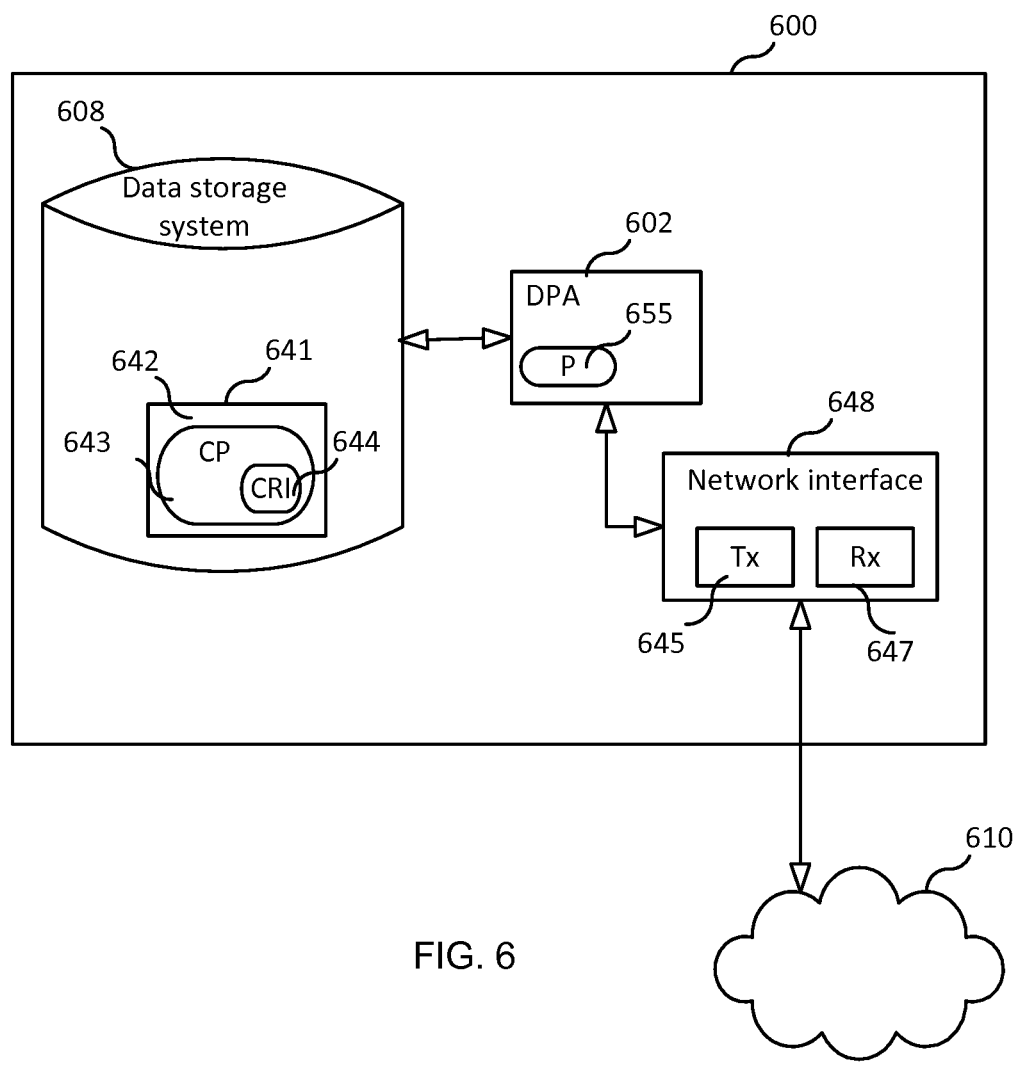
FIG. 6 is a block diagram of a media processing device according to embodiments.

FIG. 6 is a block diagram of media processing device 600 (e.g., an encoder and/or decoder) for applying filtering to a media object comprising a plurality of samples, according to one embodiment. As shown in FIG. 6, device 600 may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like); a network interface 648 comprising a transmitter (Tx) 645 and a receiver (Rx) 647 for enabling device 600 to transmit data to and receive data from other nodes connected to a network 610 (e.g., an Internet Protocol (IP) network) to which network interface 648 is connected; and a local storage unit (a.k.a., "data storage system") 608, which may include one or more non-volatile storage devices and/or one or more volatile storage devices. In embodiments where device 600 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes node 600 to perform steps described herein (e.g., steps described herein with reference to the flow charts of FIGS. 4, 5A, and 5B). In other embodiments, device 600 may be configured to perform steps described herein without the need for code. That is, for example, device 600 may consist merely of one or more ASICs. Hence, the features of the embodiments described herein may be implemented in hardware and/or software.

Figure 7:
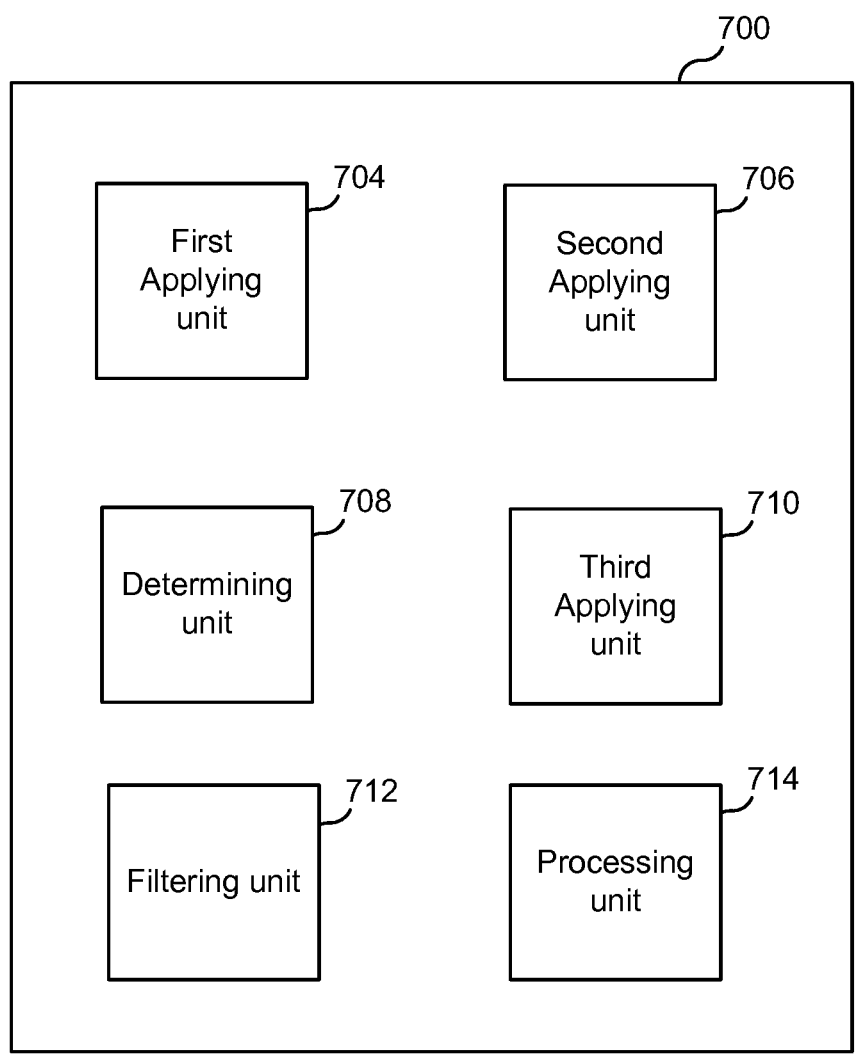
FIG. 7 is a diagram showing functional units of a media processing device according to embodiments.

FIG. 7 is a diagram showing functional units of media device 700 (e.g., an encoder and/or decoder) for applying filtering to a media object comprising a plurality of samples according to one embodiment. Device 700 may be adapted to perform one or more processes as described in FIGS. 4, 5A, and 5B. Device 700 includes a first applying unit 704 for applying a set of offset values to a set of coefficients, wherein each offset value of the set of offset values corresponds to a separate coefficient of the set of coefficients; and a second applying unit 706 for applying the filtering after applying the set of offset values. In some embodiments, device 700 further includes a determining unit 708 for determining whether a coefficient value is larger than a positive threshold or smaller than a negative threshold; and a third applying unit 710 for applying a corresponding offset value to the coefficient value based on the determination whether the coefficient value is larger than the positive threshold or smaller than the negative threshold, such that, if the coefficient value is larger than the positive threshold, then adding the corresponding value to the coefficient value, and if the coefficient value is smaller than the negative threshold, then subtracting the corresponding value from the coefficient value. The device 700 may further include a filtering unit 712.

According to some embodiments, device 700 may be adapted to perform one or more the methods of FIGS. 5A and 5B. For instance, one or more of applying units 704 and 706 may perform the step s502 of FIG. 5A or step 554 of FIG. 5B. This may be done in conjunction with determining unit 708, for instance, for step s504. Determining unit 708 may also determine one or more of an initial offset value (e.g., s552) or an adjusted offset value (s553). Filtering unit 712 may be used for performing a filtering operation on a media object, such as described with respect to step s508 or s556. An additional unit, processing unit 714, may be used for one or more video coding/processing steps, such as generating a set of coefficient through an inverse quantization process (e.g., s551) or performing an inverse transform (s555) on modified coefficients.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for processing a media object, the method comprising:
    applying a set of offset values to a set of coefficients associated with the media object, wherein the set of coefficients are inverse quantized coefficients, wherein each offset value of the set of offset values corresponds to a separate coefficient of the set of coefficients, and wherein applying the set of offset values comprises:
        determining whether a coefficient value is larger than a positive threshold or smaller than a negative threshold, and
        based on the determination, adding a corresponding offset value to the coefficient value when the coefficient value is larger than the positive threshold or subtracting the corresponding offset value from the coefficient value when the coefficient value is smaller than the negative threshold; and
    after applying the set of offset values, performing a filtering operation on the media object.

2. The method of claim 1, further comprising:
    determining a number of coefficients in the set of coefficients having a value that is either larger than the positive threshold or smaller than the negative threshold,
    wherein the corresponding offset value is based at least in part on the determined number.

3. The method of claim 1, further comprising:
    determining a factor value based at least in part on a number of coefficients in the set of coefficients having a value that is either larger than the positive threshold or smaller than the negative threshold, and
    wherein the corresponding offset value is a product of at least an initial offset value and the determined factor value.

4. The method of claim 1, wherein the offset value is based at least in part on a quantization factor or quantization parameter value.

5. The method of claim 1, further comprising:
    determining a frequency multiplier based on a maximum frequency of any non-zero coefficients of the set of coefficients, and
    wherein the corresponding offset value is a product of at least an initial offset value and the determined frequency multiplier.

6. The method of claim 5, wherein the frequency multiplier is 2.

7. The method of claim 1, wherein the media object comprises a plurality of video images and the filtering operation is one or more of bilateral filtering, deblocking filtering, adaptive loop filtering, and sample adaptive offset filtering.

8. The method of claim 1, wherein the set of coefficients corresponds to an entire block of the media object.

9. The method of claim 1, wherein the set of coefficients corresponds to portion of a block of the media object.

10. The method of claim 1, wherein the set of coefficients is a subset of a larger set of coefficients corresponding to the media object, and wherein the set of coefficients are top-left coefficients of the larger set.

11. The method of claim 1,
    wherein the corresponding offset value is a product of at least an initial offset value and a multiplier based on a block size for samples of the media object.

12. A decoder for processing a media object, the decoder being adapted to:
    apply a set of offset values to a set of coefficients associated with the media object, wherein the set of coefficients are inverse quantized coefficients, wherein each offset value of the set of offset values corresponds to a separate coefficient of the set of coefficients, and wherein applying the set of offset values comprises:
        determining whether a coefficient value is larger than a positive threshold or smaller than a negative threshold, and
        based on the determination, adding a corresponding offset value to the coefficient value when the coefficient value is larger than the positive threshold or subtracting the corresponding offset value from the coefficient value when the coefficient value is smaller than the negative threshold; and
    after applying the set of offset values, perform a filtering operation on the media object.

13. The decoder of claim 12, where the decoder is further configured to:
    determine a number of coefficients in the set of coefficients having a value that is either larger than the positive threshold or smaller than the negative threshold,
    wherein the corresponding offset value is based at least in part on the determined number.

14. An encoder for processing a media object, the encoder being adapted to:
    apply a set of offset values to a set of coefficients associated with the media object, wherein the set of coefficients are inverse quantized coefficients, wherein each offset value of the set of offset values corresponds to a separate coefficient of the set of coefficients, and wherein applying the set of offset values comprises:
- determining whether a coefficient value is larger than a positive threshold or smaller than a negative threshold, and
- based on the determination, adding a corresponding offset value to the coefficient value when the coefficient value is larger than the positive threshold or subtracting the corresponding offset value from the coefficient value when the coefficient value is smaller than the negative threshold; and
- after applying the set of offset values, perform a filtering operation on the media object.

15. The encoder of claim 14, where the encoder is further configured to:
- determine a number of coefficients in the set of coefficients having a value that is either larger than the positive threshold or smaller than the negative threshold,
- wherein the corresponding offset value is based at least in part on the determined number.

16. A method for applying filtering to a media object comprising a plurality of samples, the method comprising:
- applying a set of offset values to a set of coefficients, wherein the set of coefficients are inverse quantized coefficients, wherein each offset value of the set of offset values corresponds to a separate coefficient of the set of coefficients, and wherein applying the set of offset values comprises:
  - determining whether a coefficient value is larger than a positive threshold or smaller than a negative threshold, and
  - applying a corresponding offset value to the coefficient value based on the determination whether the coefficient value is larger than the positive threshold or smaller than the negative threshold, such that, if the coefficient value is larger than the positive threshold, then adding the corresponding value to the coefficient value, and if the coefficient value is smaller than the negative threshold, then subtracting the corresponding value from the coefficient value; and
- after applying the set of offset values, applying the filtering.

17. The method of claim 16, further comprising:
- determining a number of coefficients in the set of coefficients having a value (i) larger than the positive threshold or (ii) smaller than the negative threshold.

18. The method of claim 17, further comprising:
- determining a factor value based on the determined number of coefficients.

19. The method of claim 18, wherein adding the corresponding offset value to the coefficient value comprises:
- multiplying the corresponding offset value, the determined factor value, and a quantization factor to obtain a multiplied offset value; and
- adding the multiplied offset value to the coefficient value.

20. The method of claim 18, wherein subtracting the corresponding offset value from the coefficient value comprises:
- multiplying the corresponding offset value, the determined factor value, and a quantization factor to obtain a multiplied offset value; and
- subtracting the multiplied offset value from the coefficient value.

21. A node for applying filtering to a media object comprising a plurality of samples, the node configured to:
- apply a set of offset values to a set of coefficients, wherein the set of coefficients are inverse quantized coefficients, wherein each offset value of the set of offset values corresponds to a separate coefficient of the set of coefficients, and wherein applying the set of offset values comprises:
  - determining whether a coefficient value is larger than a positive threshold or smaller than a negative threshold, and
  - applying a corresponding offset value to the coefficient value based on the determination whether the coefficient value is larger than the positive threshold or smaller than the negative threshold, such that, if the coefficient value is larger than the positive threshold, then adding the corresponding value to the coefficient value, and if the coefficient value is smaller than the negative threshold, then subtracting the corresponding value from the coefficient value; and
- after applying the set of offset values, apply the filtering.

22. The node of claim 21, further configured to:
- determine a number of coefficients in the set of coefficients having a value (i) larger than the positive threshold or (ii) smaller than the negative threshold.

23. The node of claim 22, further configured to:
- determine a factor value based on the determined number of coefficients.

24. The node of claim 23, wherein adding the corresponding offset value to the coefficient value comprises:
- multiplying the corresponding offset value, the determined factor value, and a quantization factor to obtain a multiplied offset value; and
- adding the multiplied offset value to the coefficient value.

25. The node of claim 23, wherein subtracting the corresponding offset value from the coefficient value comprises:
- multiplying the corresponding offset value, the determined factor value, and a quantization factor to obtain a multiplied offset value; and
- subtracting the multiplied offset value from the coefficient value.

26. A computer program product comprising a non-transitory computer readable medium storing a computer program comprising instructions which, when executed by processing circuitry, causes the processing circuitry to perform the method of claim 1.

* * * * *